US012565625B2

(12) United States Patent
Williams

(10) Patent No.: US 12,565,625 B2
(45) Date of Patent: Mar. 3, 2026

(54) THIOPHOSPHATE ESTERS AS ANTIWEAR ADDITIVES FOR LUBRICANTS

(71) Applicant: Afton Chemical Corporation, Richmond, VA (US)

(72) Inventor: Darryl Williams, Glen Allen, VA (US)

(73) Assignee: Afton Chemical Corporation

( * ) Notice: Subject to any disclaimer, the term of this patent is extended or adjusted under 35 U.S.C. 154(b) by 0 days.

(21) Appl. No.: 18/959,196

(22) Filed: Nov. 25, 2024

(65) Prior Publication Data

US 2025/0197756 A1 Jun. 19, 2025

Related U.S. Application Data

(60) Provisional application No. 63/611,453, filed on Dec. 18, 2023.

(51) Int. Cl.

| | |
|---|---|
| ***C10M 137/10*** | (2006.01) |
| ***C07F 9/17*** | (2006.01) |
| ***C10M 169/04*** | (2006.01) |
| *C10N 30/00* | (2006.01) |
| *C10N 30/06* | (2006.01) |
| *C10N 40/25* | (2006.01) |

(52) U.S. Cl.

CPC ........... *C10M 137/105* (2013.01); *C07F 9/17* (2013.01); *C10M 169/04* (2013.01); *C10M 2203/003* (2013.01); *C10M 2223/047* (2013.01); *C10N 2030/06* (2013.01); *C10N 2030/44* (2020.05); *C10N 2030/45* (2020.05); *C10N 2040/25* (2013.01)

(58) Field of Classification Search

CPC ........... C10M 137/105; C10M 169/04; C10M 2203/003; C10M 2223/047; C10M 2223/042; C10M 2223/045; C07F 9/17; C10N 2030/06; C10N 2030/44; C10N 2030/45; C10N 2040/25

See application file for complete search history.

(56) References Cited

U.S. PATENT DOCUMENTS

| | | | |
|---|---|---|---|
| 2,237,625 | A | 4/1941 | Olin |
| 2,237,627 | A | 4/1941 | Olin |
| 2,527,948 | A | 10/1950 | Lyon, Jr. et al. |
| 2,578,652 | A | 12/1951 | Cassaday |
| 2,695,316 | A | 11/1954 | Mcbride |
| 2,995,569 | A | 8/1961 | Hamilton et al. |
| 3,022,351 | A | 2/1962 | Mihm et al. |
| 3,219,666 | A | 11/1965 | Norman et al. |
| 3,308,166 | A | 3/1967 | Biensan et al. |
| 3,392,201 | A | 7/1968 | Warner |
| 3,471,404 | A | 10/1969 | Myers |
| 3,502,677 | A | 3/1970 | Sner |
| 3,565,804 | A | 2/1971 | Honnen et al. |
| 3,634,515 | A | 1/1972 | Piasek et al. |
| 3,673,090 | A | 6/1972 | Waldbillig et al. |
| 3,697,429 | A | 10/1972 | Engel et al. |
| 3,697,574 | A | 10/1972 | Piasek et al. |
| 3,703,504 | A | 11/1972 | Horodysky |
| 3,703,505 | A | 11/1972 | Horodysky et al. |
| 3,736,357 | A | 5/1973 | Paisek et al. |
| 3,763,244 | A | 10/1973 | Shubkin |
| 3,796,661 | A | 3/1974 | Suratwala |
| 3,816,346 | A | 6/1974 | Coppock et al. |
| 3,873,454 | A | 3/1975 | Horodysky et al. |
| 3,991,056 | A | 11/1976 | Okamoto et al. |
| 4,036,771 | A | 7/1977 | Denis et al. |
| 4,118,329 | A | 10/1978 | Hotten |
| 4,119,549 | A | 10/1978 | Davis |
| 4,119,550 | A | 10/1978 | Davis et al. |
| 4,147,640 | A | 4/1979 | Jayne et al. |
| 4,191,659 | A | 3/1980 | Davis |
| 4,204,969 | A | 5/1980 | Papay et al. |
| 4,218,332 | A | 8/1980 | Schwab |
| 4,234,435 | A | 11/1980 | Meinhardt et al. |
| 4,240,958 | A | 12/1980 | Braid |
| 4,282,392 | A | 8/1981 | Cupples et al. |
| 4,285,822 | A | 8/1981 | deVries et al. |
| 4,344,854 | A | 8/1982 | Davis et al. |

(Continued)

FOREIGN PATENT DOCUMENTS

| | | | |
|---|---|---|---|
| CA | 3212981 | A1 | 10/2022 |
| CN | 112760155 | B | 9/2022 |

(Continued)

OTHER PUBLICATIONS

Haenel et al., Systematic Approach to Analyze and Characterize Pre-ignition Events in Turbocharged Direct-injected Gasoline Engines, SAE Int., Apr. 2011.

Takeuchi et al., Investigation of Engine Oil Effect on Abnormal Combustion in Turbocharged Direct Injection-Spark Ignition Engines, SAE Int., Nov. 2012, vol. 5, Issue 3. (Abstract).

W. W. Yau, J. J. Kirkland and D. D. Bly, "Modern Size Exclusion Liquid Chromatography", John Wiley and Sons, New York, 1979.

International Search Report and Written Opinion issued in Application No. PCT/US2023/084180 mailed on Apr. 8, 2024, 12 pages.

International Search Report and Written Opinion for PCT/US2024/058402, dated Mar. 27, 2025.

*Primary Examiner* — Ellen M McAvoy

(74) *Attorney, Agent, or Firm* — Honigman LLP

(57) ABSTRACT

The present disclosure relates to the discovery of certain ashless antiwear additives in the form of dialkyl dithiophosphate triester compounds having specific oxygen ester moieties and a specific sulfur ester moiety that combine to provide an antiwear additive that achieves performance in lubricants without the need for (or with reduced levels of) metals provided by more traditional metal-based antiwear additives. Thus, the ashless antiwear additives of the present disclosure can supplement and/or replace traditional ZDDP additives used in lubricants and still achieve desired wear and durability performance targets in all types of automotive engines.

26 Claims, No Drawings

(56) References Cited

U.S. PATENT DOCUMENTS

| | | | |
|---|---|---|---|
| 4,472,306 | A | 9/1984 | Powers et al. |
| 4,537,696 | A | 8/1985 | Beimesch |
| 4,564,709 | A | 1/1986 | Koyama et al. |
| 4,587,368 | A | 5/1986 | Pratt |
| 4,636,322 | A | 1/1987 | Nalesnik |
| 4,711,736 | A | 12/1987 | Horodysky et al. |
| 4,747,971 | A | 5/1988 | Erdman |
| 4,795,576 | A | 1/1989 | Born et al. |
| 4,857,214 | A | 8/1989 | Papay et al. |
| 4,925,983 | A | 5/1990 | Steckel |
| 4,941,984 | A | 7/1990 | Chamberlin, III et al. |
| 4,954,274 | A | 9/1990 | Zaweski et al. |
| 4,956,122 | A | 9/1990 | Watts et al. |
| 4,966,720 | A | 10/1990 | DeGonia et al. |
| 4,992,183 | A | 2/1991 | Beimesch et al. |
| 5,089,156 | A | 2/1992 | Chrisope et al. |
| 5,114,602 | A | 5/1992 | Petrille et al. |
| 5,266,223 | A | 11/1993 | Song et al. |
| 5,439,605 | A | 8/1995 | Khorramian |
| 5,614,480 | A | 3/1997 | Salomon et al. |
| 5,627,259 | A | 5/1997 | Thaler et al. |
| 5,633,326 | A | 5/1997 | Patil et al. |
| 5,643,859 | A | 7/1997 | Gutierrez et al. |
| 5,792,729 | A | 8/1998 | Harrison et al. |
| 5,851,965 | A | 12/1998 | Harrison et al. |
| 5,853,434 | A | 12/1998 | Harrison et al. |
| 5,936,041 | A | 8/1999 | Diana et al. |
| 6,117,825 | A | 9/2000 | Liu |
| 6,124,247 | A | 9/2000 | Cazin et al. |
| 6,187,723 | B1 * | 2/2001 | Holt .................... C10M 141/10 508/438 |
| 6,303,546 | B1 | 10/2001 | Hata et al. |
| 8,163,681 | B2 | 4/2012 | Bardasz et al. |
| 8,260,530 | B2 | 9/2012 | Rollinger et al. |
| 8,327,687 | B2 | 12/2012 | Amann et al. |
| 8,404,624 | B2 | 3/2013 | Ribeaud |
| 8,543,315 | B2 | 9/2013 | Glugla et al. |
| 8,598,097 | B2 | 12/2013 | Artman et al. |
| 8,709,984 | B2 | 4/2014 | Bhalla et al. |
| 9,090,850 | B1 * | 7/2015 | Edwards .............. C10M 177/00 |
| 9,481,696 | B1 | 11/2016 | Edwards et al. |
| 9,528,067 | B2 | 12/2016 | Mullay et al. |
| 10,000,721 | B2 | 6/2018 | Schilowitz et al. |
| 10,005,979 | B2 | 6/2018 | Saccomando et al. |
| 10,087,390 | B2 | 10/2018 | Esche et al. |
| 10,119,090 | B2 | 11/2018 | Gao et al. |
| 10,421,923 | B2 | 9/2019 | Saccomando et al. |
| 10,519,396 | B2 | 12/2019 | Patterson et al. |
| 10,611,981 | B2 | 4/2020 | Abraham et al. |
| 10,704,007 | B2 | 7/2020 | Hoey et al. |
| 10,704,009 | B2 | 7/2020 | Miller et al. |
| 10,738,263 | B2 | 8/2020 | Sutton et al. |
| 10,793,802 | B2 | 10/2020 | Abraham et al. |
| 10,913,915 | B2 | 2/2021 | Mosier et al. |
| 10,913,916 | B2 | 2/2021 | De Rooy et al. |
| 10,982,169 | B2 | 4/2021 | Broutin et al. |
| 10,988,702 | B2 | 4/2021 | Delbridge et al. |
| 11,008,529 | B2 | 5/2021 | Jakupca et al. |
| 11,034,912 | B2 | 6/2021 | Ritchie et al. |
| 11,066,621 | B2 | 7/2021 | Shimizu et al. |
| 11,142,695 | B2 | 10/2021 | Lee et al. |
| 11,155,765 | B2 | 10/2021 | Abraham et al. |
| 11,168,278 | B2 | 11/2021 | Barton et al. |
| 11,180,710 | B2 | 11/2021 | Filippini et al. |
| 11,214,750 | B2 | 1/2022 | Milner |
| 11,214,755 | B2 | 1/2022 | Susukida et al. |
| 11,345,872 | B2 | 5/2022 | Gao |
| 11,365,367 | B2 | 6/2022 | Vincent et al. |
| 11,384,308 | B2 | 7/2022 | Barton et al. |
| 11,535,808 | B2 | 12/2022 | Tamura |
| 11,639,480 | B1 * | 5/2023 | Baker .................. C10M 171/02 508/429 |
| 11,702,610 | B2 | 7/2023 | Knapton et al. |
| 11,739,280 | B2 | 8/2023 | Oda et al. |
| 11,739,283 | B2 | 8/2023 | Shimizu et al. |
| 11,820,958 | B2 | 11/2023 | Champagne et al. |
| 11,958,875 | B1 * | 4/2024 | Knouse ...................... C07F 9/17 |
| 12,043,817 | B1 * | 7/2024 | Hurley ................. C10M 161/00 |
| 12,054,688 | B1 * | 8/2024 | Knouse .............. C10M 137/105 |
| 12,060,537 | B2 | 8/2024 | Hanthorn et al. |
| 12,098,343 | B2 | 9/2024 | Oda et al. |
| 12,270,005 | B2 | 4/2025 | Nelson et al. |
| 2002/0165102 | A1 | 11/2002 | Hata et al. |
| 2003/0153469 | A1 * | 8/2003 | Ozbalik ............... C10M 141/10 508/438 |
| 2004/0242434 | A1 | 12/2004 | Yagishita et al. |
| 2005/0101496 | A1 | 5/2005 | Loper et al. |
| 2006/0058200 | A1 | 3/2006 | Shaw et al. |
| 2006/0217271 | A1 | 9/2006 | Brown et al. |
| 2007/0111904 | A1 | 5/2007 | Van Dam |
| 2007/0184992 | A1 | 8/2007 | Takeuchi et al. |
| 2008/0128184 | A1 | 6/2008 | Loper et al. |
| 2009/0156446 | A1 | 6/2009 | McAtee et al. |
| 2011/0111997 | A1 | 5/2011 | Cook et al. |
| 2011/0213538 | A1 | 9/2011 | Amann et al. |
| 2011/0265761 | A1 | 11/2011 | Amann et al. |
| 2012/0029789 | A1 | 2/2012 | Mehta et al. |
| 2012/0101017 | A1 | 4/2012 | Duggal |
| 2012/0186225 | A1 | 7/2012 | Amann et al. |
| 2012/0202727 | A1 | 8/2012 | Gieselman et al. |
| 2013/0035841 | A1 | 2/2013 | Glugla et al. |
| 2014/0187453 | A1 | 7/2014 | Umehara et al. |
| 2014/0187455 | A1 | 7/2014 | Umehara et al. |
| 2014/0194329 | A1 | 7/2014 | Shimizu et al. |
| 2015/0322367 | A1 | 11/2015 | Patel et al. |
| 2015/0322369 | A1 | 11/2015 | Patel et al. |
| 2016/0230116 | A1 | 8/2016 | Mosier et al. |
| 2016/0264908 | A1 | 9/2016 | Jones et al. |
| 2016/0281020 | A1 | 9/2016 | Yamamoto et al. |
| 2017/0015926 | A1 | 1/2017 | Fletcher et al. |
| 2017/0015930 | A1 | 1/2017 | Fletcher |
| 2017/0022441 | A1 | 1/2017 | Onodera |
| 2017/0175027 | A1 | 6/2017 | Gieselman |
| 2018/0002631 | A1 | 1/2018 | Milner |
| 2018/0119046 | A1 * | 5/2018 | Edwards ............ C10M 137/105 |
| 2018/0355274 | A1 | 12/2018 | Koyama |
| 2019/0284495 | A1 * | 9/2019 | Abraham ........... C10M 137/105 |
| 2021/0002577 | A1 | 1/2021 | Mosier et al. |
| 2021/0024848 | A1 | 1/2021 | Saccomando et al. |
| 2021/0371767 | A1 | 12/2021 | Shimizu et al. |
| 2022/0186137 | A1 | 6/2022 | Utaka |
| 2022/0213401 | A1 | 7/2022 | Chommeloux et al. |
| 2022/0220410 | A1 | 7/2022 | Ruhe, Jr. et al. |
| 2022/0289771 | A1 | 9/2022 | Zhuang et al. |
| 2022/0411713 | A1 | 12/2022 | Neville et al. |
| 2023/0120889 | A1 | 4/2023 | Matsubara et al. |
| 2023/0383214 | A1 * | 11/2023 | Kaneko ................ C10M 141/10 |
| 2024/0026242 | A1 | 1/2024 | Yoshida et al. |
| 2024/0101923 | A1 | 3/2024 | Fuchi et al. |
| 2024/0199974 | A1 * | 6/2024 | Vincent ................ C10M 137/04 |
| 2025/0263626 | A1 * | 8/2025 | Vincent ................ C10M 141/10 |

FOREIGN PATENT DOCUMENTS

| | | | |
|---|---|---|---|
| CN | 115010751 | A | 9/2022 |
| CN | 111057108 | B | 8/2023 |
| CN | 111057111 | B | 8/2023 |
| EP | 88453 | A1 | 9/1983 |
| EP | 612839 | A1 | 8/1994 |
| EP | 1788068 | A1 | 5/2007 |
| EP | 1985690 | A2 | 10/2008 |
| EP | 2639433 | A1 | 9/2013 |
| GB | 961009 | | 6/1964 |
| GB | 1162334 | | 8/1969 |
| JP | 2014152301 | A | 8/2014 |
| JP | 2016534216 | A | 11/2016 |
| JP | 2017514984 | A | 6/2017 |
| JP | 2017149830 | A | 8/2017 |
| JP | 201821107 | A | 2/2018 |
| JP | 2018168344 | A | 11/2018 |
| JP | 7312717 | B2 | 7/2023 |
| WO | 2009104682 | A1 | 8/2009 |
| WO | 2015023559 | A1 | 2/2015 |
| WO | 2015042337 | A1 | 3/2015 |

(56) References Cited

FOREIGN PATENT DOCUMENTS

| | | | |
|---|---|---|---|
| WO | 2015042340 | A1 | 3/2015 |
| WO | 2015042341 | A1 | 3/2015 |
| WO | 2015076417 | A1 | 5/2015 |
| WO | 20150114920 | A1 | 8/2015 |
| WO | 2017011691 | A1 | 1/2017 |
| WO | 2017083546 | A1 | 5/2017 |
| WO | 2019155739 | A1 | 8/2019 |
| WO | 2020085153 | A1 | 4/2020 |
| WO | 2020085228 | A1 | 4/2020 |
| WO | 2021064059 | A1 | 4/2021 |
| WO | 2022097357 | A1 | 5/2022 |
| WO | 2022128802 | A1 | 6/2022 |
| WO | 2022212844 | A1 | 10/2022 |
| WO | 2023156989 | A1 | 8/2023 |

* cited by examiner

THIOPHOSPHATE ESTERS AS ANTIWEAR ADDITIVES FOR LUBRICANTS

RELATED APPLICATIONS

The present application claims priority to U.S. Provisional Patent Application U.S. 63/611,453 filed Dec. 18, 2023; wherein the entirety of said Application is incorporated herein by reference.

TECHNICAL FIELD

This disclosure relates to thiophosphate esters suitable for antiwear additives in lubricants, and more particularly, thiophosphate triesters suitable as ashless antiwear additives in lubricants.

BACKGROUND

Automotive manufacturers continue to push for improved efficiency and fuel economy, and demands on engines, lubricants, and their components continue to increase in order to achieve the improved efficiency. Today's engines are often smaller, lighter and more efficient with technologies designed to improve fuel economy, performance, and power. These requirements also mean engine oil performance must evolve to meet the higher demands of such modern engines and their corresponding performance criteria tied to their unique use and applications. With such exacting demands for engine oils, lubricant manufacturers often tailor lubricants and their additives to meet certain performance requirements for each unique application.

Updated lubricant specifications often include compositional constraints in terms of the permitted levels of ash, individual or total metals, and/or other components, and maintaining such constraints while still meeting the heightened demands of the newest lubricant standards tends to be challenging. In many circumstances, however, varying one component within a lubricant composition to improve performance tends to negatively impact other performance characteristics. For instance, metal-containing dialkyl dithiophosphate antiwear additives (e.g., ZDDP) have been used for a number of years to provide antiwear protection and durability in engines. Recently, there has been momentum to limit the amount of metals in lubricants for a number of reasons, but replacing the performance of conventional metalized antiwear additives, such as ZDDP additives, has been challenging because suitable replacement additives often have one or more shortcomings when seeking to achieve the required performance demands of the newer automotive and industry performance tests.

SUMMARY

In one approach or embodiment, the present disclosure provides for an ashless antiwear additive comprising a triester of a dithiophosphate having two oxygen ester moieties and a sulfur ester moiety. In one aspect, each oxygen ester moiety, independently, includes at least 2 or more β-hydrogens on a linear or branched hydrocarbyl group. In another aspect, the sulfur ester moiety includes one or more heteroatoms selected from oxygen or nitrogen and having up to 4 carbon atoms linking at least one of the heteroatoms to the sulfur atom of the sulfur ester. In yet another aspect, the ashless antiwear additive has a molecular weight of at least about 490 g/mol (at least about 500 g/mol or at least about 520 g/mol).

In another approach or embodiment, the triester of a dithiophosphate described in the previous paragraph is a compound having the structure of Formula I:

(Formula I)

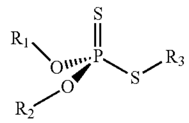

wherein $R_1$ and $R_2$ include the oxygen ester moieties and, independently, may be a linear or branched C3 to C100 hydrocarbyl group; and $R_3$ includes the sulfur ester moiety with a C3 to C100 linear or branched hydrocarbyl group including the one or more heteroatoms. The compound of Formula I has a molecular weight of at least about 490 g/mol (at least about 500 g/mol or at least about 520 g/mol).

In yet further approaches or embodiments, the ashless antiwear additive of either the two previous paragraphs may include one or more optional features or embodiments in any combination. These optional features or embodiments may include one or more of the following: wherein the oxygen ester moieties of $R_1$ and $R_2$ are, independently, derived from one of 4-methyl-2-pentyl alcohol, isopropyl alcohol, tert-butyl alcohol, sec-butyl alcohol, 2-octanol, 2-decanol, 2-dodecanol, or combinations thereof; and/or wherein the sulfur ester moiety of $R_3$ is derived from one of (i) a vinyl ester of a carboxylic acid; (ii) a maleic acid, ester, diester or anhydride thereof; (iii) an alkyl (meth)acrylate, or combinations thereof; and/or wherein the sulfur ester moiety of $R_3$ is derived from (i) the vinyl ester of a carboxylic acid and selected from vinyl acetate, vinyl propionate, vinyl laurate, vinyl octanoate, vinyl decanoate, vinyl stearate, or combinations thereof; and/or wherein the sulfur ester moiety of $R_3$ is derived from (ii) the maleic acid, ester, diester or anhydride thereof and selected from methyl maleate, dimethyl maleate, ethyl maleate, diethyl maleate, butyl maleate, dibutyl maleate, diphenyl maleate, methyl fumarate, dimethyl fumarate, ethyl fumarate, diethyl fumarate, butyl fumarate, dibutyl fumarate, diphenyl fumarate, or combinations thereof; and/or wherein the sulfur ester moiety of $R_3$ is derived from (iii) the alkyl (meth)acrylate and selected from methyl acrylate, methyl methacrylate, ethyl acrylate, ethyl methacrylate, butyl acrylate, butyl methacrylate, or combinations thereof; and/or wherein the triester of a dithiophosphate includes each oxygen ester derived from 4-methyl-2-pentyl alcohol and the sulfur ester derived from dibutyl maleate; and/or when used in a zinc-free and low-ash passenger car motor oil having no more than 0.5 weight percent ash pursuant to ASTM D874 and having no more than 10 ppm of zinc, the zinc-free and low-ash passenger car motor oil exhibits no more than 90 microns of camshaft wear pursuant to the Sequence IVA test of ASTM D6891 and at least about 81 percent phosphorus retention pursuant to the Sequence IIIH B test of ASTM D8111; and/or wherein the molecular weight is up to about 650 g/mol; and/or further comprising no more than 6.3 weight percent phosphorus.

In yet a further approach or embodiment, a lubricant (e.g., a passenger car motor oil) is described herein comprising (1) one or more base oils of lubricating viscosity; and (2) any embodiment of a triester of a dithiophosphate antiwear additive described in this Summary. In one aspect, the triester of a dithiophosphate antiwear additive suitable for the lubricant includes (i) two oxygen ester moieties with each moiety having at least 2 or more β-hydrogens on a linear or branched hydrocarbyl group; (ii) a sulfur ester moiety including one or more heteroatoms selected from oxygen or nitrogen and having up to 4 carbon atoms linking at least one of the heteroatoms to the sulfur atom of the sulfur ester; and (iii) a molecular weight of at least about 490 g/mol (at least about 500 g/mol or at least about 520 g/mol).

In other approaches or embodiments, the lubricant described in the previous paragraph may include one or more optional features or embodiments in any combination. These optional features or embodiments may include one or more of the following: wherein the passenger car motor oil is substantially zinc-free with no more than about 10 ppm of zinc and/or has low ash content with no more than about 0.5 weight percent sulfated ash pursuant to ASTM D874; and/or further comprising a metal-containing antiwear additive selected from a metal phosphate, a metal thiophosphate, a metal dialkyl dialkyldithiophosphate, or combinations thereof and with the metal selected from aluminum, lead, tin, molybdenum, manganese, nickel, copper, titanium, zinc, or combinations thereof; and/or wherein the passenger car motor oil exhibits no more than 90 microns of camshaft wear pursuant to the Sequence IVA test of ASTM D6891 and at least about 81 percent phosphorus retention pursuant to the Sequence IIIH B test of ASTM D8111; and/or wherein the triester of a dithiophosphate has the structure of Formula I:

(Formula I)

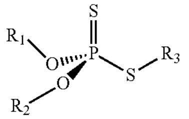

wherein $R_1$ and $R_2$ include the oxygen ester moieties and, independently, a linear or branched C3 to C100 hydrocarbyl group; and $R_3$ includes the sulfur ester moiety including a C3 to C100 linear or branched hydrocarbyl group including the one or more heteroatoms; and/or wherein the one or more oxygen ester moieties of $R_1$ and $R_2$ are, independently, derived from one of 4-methyl-2-pentyl alcohol, isopropyl alcohol, tert-butyl alcohol, sec-butyl alcohol, 2-octanol, 2-decanol, 2-dodecanol, or combinations thereof; and/or wherein the sulfur ester moiety of $R_3$ is derived from one of (i) a vinyl ester of a carboxylic acid; (ii) a maleic acid, ester, diester or anhydride thereof; (iii) alkyl (meth)acrylate, or combinations thereof; and/or wherein the sulfur ester moiety of $R_3$ is derived from (i) the vinyl ester of a carboxylic acid and selected from vinyl acetate, vinyl propionate, vinyl laurate, vinyl octanoate, vinyl decanoate, vinyl stearate, or combinations thereof; and/or wherein the sulfur ester moiety of $R_3$ is derived from (ii) the maleic acid, ester, diester or anhydride thereof and selected from methyl maleate, dimethyl maleate, ethyl maleate, diethyl maleate, butyl maleate, dibutyl maleate, diphenyl maleate, methyl fumarate, dimethyl fumarate, ethyl fumarate, diethyl fumarate, butyl fumarate, dibutyl fumarate, diphenyl fumarate, or combinations thereof; and/or wherein the sulfur ester moiety of $R_3$ is derived from (iii) the alkyl (meth)acrylate and selected from methyl acrylate, methyl methacrylate, ethyl acrylate, ethyl methacrylate, butyl acrylate, butyl methacrylate, or combinations thereof; and/or wherein the triester of a dithiophosphate includes the oxygen ester moieties each derived from 4-methyl-2-pentyl alcohol and the sulfur ester derived from dibutyl maleate; and/or wherein the passenger car motor oil is a zinc-free and low-ash passenger car motor oil having no more than 0.5 weight percent ash pursuant to ASTM D874 and having no more than 10 ppm of zinc, and wherein the zinc free and low-ash passenger car motor oil exhibits no more than 90 microns of camshaft wear pursuant to the Sequence IVA test of ASTM D6891 and at least about 81 percent phosphorus retention pursuant to the Sequence IIIH B test of ASTM D8111; and/or wherein the molecular weight of the triester of a dithiophosphate antiwear additive is up to about 650 g/mol; and/or further comprising about 50 to about 2000 ppm of phosphorus provided by the triester of a dithiophosphate antiwear additive; and/or wherein the passenger car motor oil further includes no more than about 1250 ppm of calcium and/or no more than about 100 ppm of boron.

In yet further approaches or embodiments, the use of a triester of a dithiophosphate antiwear additive of any embodiment of this Summary in a lubricant is described. In one aspect, the use of any embodiment from this Summary of the triester of a dithiophosphate is in a lubricant to achieve no more than 90 microns of camshaft wear pursuant to the Sequence IVA test of ASTM D6891 and at least about 81 percent phosphorus retention pursuant to the Sequence IIIH B test of ASTM D811. In some optional approaches or embodiments, the use may be in a passenger car motor oil that is a zinc-free and low-ash having no more than 0.5 weight percent ash pursuant to ASTM D874 and having no more than 10 ppm of zinc.

Additional details and advantages of the disclosure will be set forth in part in the description that follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

As noted in the Background, metalized antiwear additives, such as zinc dialkyl dithiophosphate (ZDDP) antiwear additives, have been used in lubricants for a number of years to provide antiwear protection and improve engine durability. The present disclosure relates to the discovery of certain ashless (i.e., metal-free) antiwear additives in the form of dialkyl dithiophosphate triester compounds having specific oxygen ester moieties and a specific sulfur ester moiety that combine to provide an antiwear additive that achieves performance in lubricants without the need for (or with reduced levels of) metals provided by more traditional metal-based antiwear additives. Thus, the ashless antiwear additives of the present disclosure can supplement and/or replace traditional ZDDP additives used in lubricants and still achieve desired wear and durability performance targets in all types of automotive engines (e.g., spark-ignition, compression-ignition, heavy-duty diesel, passenger car, light duty diesel, medium duty diesel, and/or marine engines) and combusting a wide variety of fuels (e.g., diesel, gasoline, natural gas, bio-fuel, mixed diesel/biofuel, a mixed gasoline/biofuel, alcohol, a mixed gasoline/alcohol, compressed natural gas (CNG), or mixtures thereof).

In one approach, the ashless antiwear additives of the present disclosure are suitable for lubricants configured to have low levels of ash (e.g., about 0.5 weight percent or less as discussed herein). In other approaches, the ashless antiwear additives of the present disclosure may also be used with more conventional lubricants (e.g., greater than about 0.5 weight percent ash) to reduce some or most of the metal-containing additives. As known, the ash content of lubricants can be determined by the levels of sulfated ash (SASH), which is a measurement that indicates the total weight percent of ash in a lubricating oil composition. The sulfated ash measurement for a lubricating oil composition is related to the total metal content therein and may be conveniently measured according to ASTM D874 and/or other common evaluation methods known in the art and as described herein. In one optional aspect, this disclosure describes lubricants including the novel ashless antiwear additives that provide performance in a low sulfated ash (SASH) composition having about 0.5 weight percent or less, about 0.3 weight percent or less, about 0.1 weight percent or less, about 0.05 weight percent or less, or no detectable levels of sulfated ash. In other aspects, this disclosure describes lubricants including the novel ashless antiwear additives that provide performance in a conventional lubricant having a sulfated ash (SASH) content of greater than about 0.5 weight percent, greater than about 0.6 weight percent, greater than about 0.8 weight percent, or about 0.5 to about 2.0 weight percent of sulfated ash (or other ranges therein) combined with reduced levels of other metal-containing additives. As such, the ashless antiwear additives of this disclosure may be used in place of traditional ZDDP additives and/or combined with lower levels of traditional ZDDP additives than previously used in lubricants.

Turning to more of the specifics, the present disclosure relates to an ashless antiwear additive in the form of a triester of a dithiophosphate having two oxygen ester moieties and a sulfur ester moiety. Each oxygen ester moiety, independently, includes a linear or branched hydrocarbyl group having at least 2 or more β-hydrogens. The sulfur ester moiety also includes a linear or branched hydrocarbyl group and includes one or more heteroatoms selected from oxygen or nitrogen with up to 4 carbon atoms linking at least one of the heteroatoms to the sulfur atom of the sulfur ester. The ashless antiwear additives herein also have a minimum molecular weight of at least about 490 g/mol. Such ashless antiwear additives, when used (for instance) in a passenger car motor oil, exhibits no more than about 90 microns of camshaft wear pursuant to the sequence IVA test of ASTM D6891 and at least about 81 percent of phosphorus retention pursuant to the Sequence IIIH/B test procedure of ASTM D8111. Surprisingly, such results can also be achieved, in optional embodiments, in a zinc-free and low-ash passenger car motor oil having no more than about 0.5 weight percent sulfated ash pursuant to ASTM D874 and having no more than about 10 ppm of zinc. In other embodiments, the ashless antiwear additive herein can be used in combination with (or with reduced amounts of) traditional zinc antiwear additives if needed.

In one embodiment, the ashless antiwear additive of the present disclosure is in the form of a triester of a dithiophosphate having the structure of Formula I:

(Formula I)

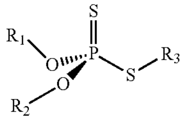

wherein $R_1$ and $R_2$ represent the oxygen ester moieties and, independently, include a linear or branched C3 to C100 hydrocarbyl group having 2 or more β-hydrogens (preferably, 2 to 6 β-hydrogens); and $R_3$ represents the sulfur ester moiety and includes a C3 to C100 linear or branched hydrocarbyl group including one or more heteroatoms selected from oxygen or nitrogen and having up to 4 carbon atoms linking at least one of the heteroatoms to the sulfur atom of the sulfur ester. At noted above, the compound of Formula I also has a minimum molecular weight of at least about 490 g/mol, and in other embodiments, about 490 g/mol to about 650 g/mol, in yet other embodiments, about 490 g/mol to about 640 g/mol, or about 490 g/mol to about 620 g/mol. As shown in the Examples below, the desired molecular weight can be achieved by selecting both the appropriate oxygen ester moieties (e.g., $R_1$ and $R_2$) combined with the appropriate sulfur ester moiety (e.g., $R_3$) within the constructs defined for each of these ester groups as discussed more below.

Oxygen Ester Moiety of the Additive: In one approach, the oxygen ester moieties (e.g., $R_1$ and $R_2$ of Formula I) each include, independently, a linear or branched C3 to C100 hydrocarbyl group, in other approaches, a linear or branched C3 to C50 hydrocarbyl group, a linear or branched C3 to C20 hydrocarbyl group, or preferably a linear or branched C6 to C10 hydrocarbyl group, or most preferably a linear or branched C6 to C8 hydrocarbyl group where each linear or branched hydrocarbyl group includes at least 2 β-hydrogens (or 2 to 9 β-hydrogens, preferably 2 to 6 β-hydrogens, more preferably 2 to 5 β-hydrogens, and most preferably 5 β-hydrogens) in the hydrocarbyl group. As known to those of ordinary skill, a β-hydrogen refers to any hydrogen on the β-carbon of the hydrocarbyl group with the α-carbon being the carbon atom bonded to the oxygen atom of the dithiophosphate (i.e., the α-carbon is the carbon bonded to the hydroxyl group in the alcohol used to form the oxygen esters). Without wishing to be limited by theory, it is believed if the oxygen ester moieties do not have the noted levels of β-hydrogens in the $R_1$ and $R_2$ groups, then the formed additives tend to decompose too quickly to form a sufficient protective film on the desired engine surfaces and, thus, do not achieve desired levels of wear protection in the Sequence IVA test.

In other approaches or embodiments, the oxygen ester moieties $R_1$ and $R_2$ of Formula I above are, independently, derived from one or more secondary alcohols providing the noted levels of β-hydrogens. For instance, suitable secondary alcohols used to form the oxygen ester moieties include, but are not limited to, 4-methyl-2-pentyl alcohol (providing 5 β-hydrogens), isopropyl alcohol (providing 6 β-hydrogens), tert-butyl alcohol (providing 9 β-hydrogens), sec-butyl alcohol (providing 5 β-hydrogens), 2-octanol (providing 5 β-hydrogens), 2-decanol (providing 5-hydrogens), 2-dodecanol (providing 5 β-hydrogens), or combinations thereof. Preferably, the oxygen esters of Formula I are each derived from 4-methyl-2-pentyl alcohol providing 5 β-hydrogens in each of the oxygen ester groups; however, selection of this preferred oxygen esters also needs to be matched with a suitable sulfur ester moiety to derive the noted minimum molecular weights for the additive to achieve performance.

Sulfur Ester Moiety of the Additive: In one approach or embodiment, the sulfur ester moiety (e.g., $R_3$ of Formula I) includes a linear or branched C3 to C100 hydrocarbyl group (in other approaches, a linear or branched C3 to C50 hydrocarbyl group, or a linear or branched C3 to C30 hydrocarbyl group) including one or more heteroatoms selected from oxygen or nitrogen (preferably oxygen) and having up to 4 carbon atoms linking at least one of the heteroatoms (preferably the oxygen atom) to the sulfur atom of the sulfur ester moiety. In other approaches, the sulfur ester has up to 2 carbon atoms linking the heteroatom to the sulfur atom, or preferably 1 or 2 carbon atoms. The sulfur ester moiety may also include in other embodiments, as needed, one or more carbonyl groups in its hydrocarbyl chain.

In one approach or embodiment, the sulfur ester moiety represented by $R_3$ in Formula I above is derived, for instance, from one of (i) a vinyl ester; (ii) an unsaturated carboxylic acid, ester, diester, or anhydride thereof; (iii) an alkyl (meth)acrylate, or (iv) combinations thereof. In addition, the sulfur ester moiety needs to be selected in combination with the particular oxygen ester moieties noted above to achieve the minimum molecular weights of the additive of at least about 490 g/mol to obtain wear performance (e.g., Sequence IVA) and phosphorus retention (e.g., Sequence IIIH/B).

In one embodiment, the sulfur ester moiety of $R_3$ of Formula I may be derived from a vinyl ester. In this approach, suitable vinyl esters include vinyl esters of carboxylic acids and may include, but are not limited to, vinyl acetate, vinyl propionate, vinyl laurate, vinyl octanoate, vinyl decanoate, vinyl stearate, or the like, or combinations thereof. If the sulfur ester moiety is formed from the vinyl ester, then again, the vinyl ester also needs to have a sufficient carboxylic acid portion when used in conjunction with the appropriate oxygen ester moieties to meet the minimum molecular weights noted above to achieve wear and phosphorus retention performance. In a preferred embodiment, the sulfur ester moiety may be derived from vinyl laurate (and most preferably vinyl laurate combined with each oxygen ester derived from 4-methyl-2-pentyl alcohol). In another embodiment, the sulfur ester moiety may be derived from vinyl stearate.

In another embodiment, the sulfur ester moiety of $R_3$ may be derived from an unsaturated carboxylic acid, ester, diester, or anhydride thereof. For instance, the unsaturated carboxylic acid, ester, diester, or anhydride may be maleic acid, fumaric acid, an ester, a diester, or an anhydride thereof. For instance, suitable unsaturated acids, esters, or anhydrides may include, but are not limited to, methyl maleate, dimethyl maleate, ethyl maleate, diethyl maleate, butyl maleate, dibutyl maleate, diphenyl maleate, methyl fumarate, dimethyl fumarate, ethyl fumarate, diethyl fumarate, butyl fumarate, dibutyl fumarate, diphenyl fumarate, combinations thereof, anhydrides thereof, or the like, or combinations thereof. If the sulfur ester moiety is formed from the unsaturated carboxylic acid, ester, diester, or anhydride, then again, the desired acid, ester, or anhydride needs to be selected in conjunction with the appropriate oxygen ester moieties discussed above to meet the minimum molecular weights noted above to achieve wear and phosphorus retention performance. In a preferred embodiment, the sulfur ester moiety may be derived from dibutyl maleate (and most preferably dibutyl maleate combined with each oxygen ester derived from 4-methyl-2-pentyl alcohol).

In yet another embodiment, the sulfur ester moiety of $R_3$ may be derived from an alkyl (meth)acrylate. In this approach, suitable alkyl (meth)acrylates may include, but are not limited to, methyl acrylate, methyl methacrylate, ethyl acrylate, ethyl methacrylate, butyl acrylate, butyl methacrylate, or the like, or combinations thereof. As with the other approaches of the sulfur ester moiety, if the sulfur ester moiety is formed from the alkyl (meth)acrylate, then again, the desired alkyl (meth)acrylate needs to be selected in conjunction with the appropriate oxygen ester moieties to meet the minimum molecular weights noted above to achieve wear and phosphorus retention performance.

The ashless antiwear additives herein can be prepared in a number of ways, but preferably are prepared by first reacting the selected secondary alcohol with phosphorus pentasulfide. In some approaches, the phosphorus pentasulfide may be a monomer or dimer thereof. The reaction of the selected secondary alcohol with phosphorus pentasulfide forms an intermediate dialkyl dithiophosphoric acid, which is then further reacted in a second step with the selected organic compound to form the sulfur ester moiety, which is preferably one of (i) the vinyl ester; (ii) the unsaturated carboxylic acid, ester, diester, or anhydride thereof; (iii) the alkyl (meth)acrylate, or (iv) combinations thereof to form the ashless antiwear additives of the present application. The reaction of this second step may be carried out at about 70° C. to about 150° C. for about 2 to about 24 hours or as needed to achieve the desired final product.

In one exemplary approach or embodiment, the ashless antiwear additives herein may be prepared by reacting, in a first reaction step, the above-described secondary alcohol (preferably 4-methyl-2-pentyl alcohol for instance) and the phosphorus pentasulfide in a molar ratio of the secondary alcohol to the phosphorus pentasulfide of about 1:1 to about 20:1, or about 2:1 to about 15:1, or about 3:1 to about 10:1, or about 3.5:1 to about 7:1, or about 3.5:1 to about 5:1, to form the above-described intermediate reaction product. The intermediate reaction product is then further reacted, in a second reaction step, with the above-described organic compound (preferably, vinyl stearate or dibutyl maleate for instance) with a molar ratio of the selected organic compound to the secondary alcohol of about 0.1:1 to about 10:1, or about 0.3:1 to about 5:1, or about 0.5:1 to about 1:1. Resultant product may include, in some embodiments using the preferred reactants, one or more of, 1-((bis((4-methylpentan-2-yl)oxy) phosphorothioyl)thio)ethyl stearate or dibutyl 2-((bis((4-methylpentan-2-yl)oxy) phosphorothioyl) thio)succinate.

In approaches and embodiments herein, the resultant ashless antiwear additive may preferably be used in a lubricating composition in amounts of about 0.01 to about 10 weight percent, in other approaches, about 0.1 to about 5.0 weight percent, and in further approaches, about 0.2 to about 3.0 weight percent. The ashless antiwear additives herein may also provide a selected amount of phosphorus to the lubricants and motor oils. In some embodiments, for instance, the triester of a dithiophosphate of Formula I above may provide about up to about 3000 ppm of phosphorus, about 50 to about 1500 ppm phosphorus, or about 100 to about 1200 ppm of phosphorus, or about 300 to about 800 ppm of phosphorus. In other embodiments, the mass percentage of phosphorus in the ashless antiwear compound of Formula I is less than about 7.0% or, in other approaches, the ashless antiwear compounds herein includes about 2.5% to about 6.3% phosphorus by mass or, in yet further approaches, the ashless antiwear compounds herein includes about 5% to about 6% phosphorus by mass.

Based on the preferred selections of the oxygen ester moieties (e.g., secondary alcohols) and the sulfur ester moiety (organic reactants for the second reaction step), suitable examples of the ashless antiwear additive of the present disclosure include those of Formulas Ia and Ib below derived from 4-methyl-2-pentyl alcohol forming the oxygen ester moieties (with 5 β-hydrogens in each oxygen ester moiety) and either vinyl stearate or dibutyl maleate forming the sulfur ester moieties:

(Formula Ia)

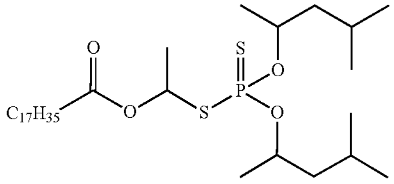

The exemplary compound of Formula 1a is derived from vinyl stearate, 4-methyl-2-pentyl alcohol, and phosphorus pentasulfide. The additive of Formula 1a has 5 β-hydrogens in the oxygen ester moiety, about 5.1 weight percent phosphorus, and has a number average molecular weight of 609.

(Formula Ib)

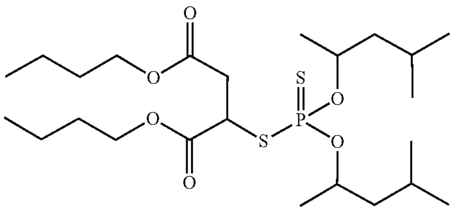

The exemplary compound of Formula 1b is derived from dibutyl maleate, 4-methyl-2-pentyl alcohol, and phosphorus pentasulfide. The additive of Formula 1b also has 5 β-hydrogens in each oxygen ester moiety, about 5.9 weight percent phosphorus, and has a number average molecular weight of 527. Other suitable ashless antiwear additives can be formed in a similar reaction scheme upon selecting the appropriate starting secondary alcohol and appropriate organic reactant for the second step pursuant to constructs set forth above to derive additives having the noted numbers of β-hydrogens and minimum molecular weight.

As noted above, the ashless antiwear additives herein, in some embodiments, may be used in zinc-free and low-ash lubricant compositions having low levels of zinc (e.g., about 10 ppm or less zinc, about 8 ppm or less zinc, about 6 ppm or less zinc, or no detectable levels of zinc) and/or having low ash contents (e.g., compositions having no more than about 0.5 weight percent SASH pursuant to ASTM D874, or about 0.3 weight percent or less, about 0.2 weight percent or less, about 0.1 weight percent or less, about 0.08 weight percent or less, about 0.07 weight percent or less, or about 0.06 weight percent or less of SASH (ASTM D874)). In other embodiments, the zinc-free and low-ash lubricant compositions herein may also include about 0.01 weight percent or more of sulfated ash, about 0.02 weight percent or more, about 0.03 weight percent or more, or about 0.04 weight percent or more of sulfated ash (ASTM D874).

In embodiments where the ashless antiwear additives herein are used in the zinc-free and low-ash lubricant compositions, the lubricants may include greater than about 50 ppm to about 3000 ppm phosphorus, or up to about 1200 ppm phosphorus, up to about 800 ppm phosphorus, up to about 700 ppm phosphorus, up to about 600 ppm phosphorus, up to about 500 ppm phosphorus, or up to about 400 ppm phosphorus provided by the ashless antiwear additive. In other approaches, the zinc-free and low-ash lubricants herein may include about 400 to about 1200 ppm of phosphorus from the ashless antiwear additive, or about 600 ppm to about 800 ppm of phosphorus from the ashless antiwear additive, or about 800 to about 1200 ppm of phosphorus from the ashless antiwear additive.

As shown in the Examples below, when the ashless antiwear additives herein are used in, for instance, passenger car motor oils, the lubricant is capable of exhibiting no more than about 90 microns of camshaft wear pursuant to the Sequence IVA test of ASTM D6891 and at least about 81 percent phosphorus retention pursuant to the Sequence IIIH/B test of ASTM D8111. In other embodiments, when the ashless antiwear additives herein are used in the optional zinc-free and low-ash passenger car motor oil embodiments having no more than about 0.5 weight percent sulfated ash pursuant to ASTM D874 and having no more than about 10 ppm of zinc, the lubricants are still capable of exhibiting no more than about 90 microns of camshaft wear pursuant to the Sequence IVA test of ASTM D6891 and at least about 81 percent phosphorus retention pursuant to the Sequence IIIH/B test of ASTM D8111.

The ashless antiwear additives herein may be used with a wide variety of conventional lubricants (e.g., lubricants having sulfated ash levels up to about 2 weight percent and, preferably, greater than about 0.5 weight percent) and/or low-ash lubricants (e.g., lubricants with sulfated ash levels of about 0.5 weight percent or less). For instance, lubricant compositions herein with the ashless antiwear additives may be combined with an additive package providing compounds with boron, calcium, magnesium, molybdenum, and/or zinc as needed for a particular application. In one embodiment, for instance, the lubricants herein with the ashless antiwear additive may also include an additive mixture providing one or more of the following: up to about 500 ppm of boron, up to about 3000 ppm of calcium, up to about 2000 ppm of magnesium, up to about 1500 ppm of molybdenum, up to about 1000 ppm of zinc, and/or any combination thereof. Such lubricants may be conventional lubricant compositions providing up to 1 weight percent sulfated ash and/or up to about 2 weight percent sulfated ash. In other approaches, the lubricating oil compositions herein with the ashless antiwear additive may be low-ash formulations and include additives providing about 1300 ppm or less (or about 1250 ppm or less, or about 1200 ppm or less, or about 1000 ppm or less, or about 500 ppm or less) of each of calcium, magnesium, zinc, molybdenum, and/or combinations thereof together with additives providing no more than about 100 ppm of boron (preferably no more than about 80 ppm of boron, or no more than about 60 ppm of boron). In yet other approaches, the lubricating compositions herein with the ashless antiwear additives may be substantially free of metallic detergents and, in such context, the lubricating composition have metal detergents providing less than about 100 ppm of total detergent metals, less than 80 ppm of total detergent metals, less than 50 ppm of total detergent metals, less than 20 ppm of total detergent metals, or less than 10 ppm of total detergent metals where detergent metals are selected from calcium, magnesium, sodium, and the like. In other optional approaches, the lubricating oil compositions herein are also substantially free of metal dialkyldithiophosphates (such as zinc dialkyldithiophosphates) and, in such context, preferably have about 10 ppm or less of zinc provided by such metal dialkyldithiophosphate.

In yet other embodiments, the ashless antiwear additives herein may also be used in passenger car motor oils having metal-containing antiwear additive selected from a metal phosphate, a metal thiophosphate, a metal dialkyl dialkyldithiophosphate, or combinations thereof and with the metal selected from aluminum, lead, tin, molybdenum, manganese, nickel, copper, titanium, zinc, or combinations thereof.

In this approach, the lubricants may include greater than about 50 ppm to about 3000 ppm phosphorus, or up to about 1200 ppm phosphorus, up to about 800 ppm phosphorus, up to about 700 ppm phosphorus, up to about 600 ppm phosphorus, up to about 500 ppm phosphorus, or up to about 400 ppm phosphorus provided by both the ashless antiwear additive of this disclosure and one or more metal-containing antiwear additive(s) combined. In other approaches, the lubricants herein may include about 400 to about 1200 ppm of phosphorus from the combination of the ashless antiwear additive and the metal-containing antiwear additive(s) combined, or about 600 ppm to about 800 ppm of phosphorus from the combination of the ashless antiwear additive and the metal-containing antiwear additive(s), or about 800 to about 1200 ppm of phosphorus from the combination of the ashless antiwear additive and the metal-containing antiwear additive(s). When both the ashless antiwear additive and the metal-containing antiwear additive(s) are used together to provide a total amount of phosphorus, a weight ratio of the ashless antiwear additive to the one or more metal-containing antiwear additive(s) may be about 0.001 to about 1000:1 or, more preferably, about 0.2:1 to about 20:1, or most preferably, about 0.3:1 to about 3:1.

Lubricating Oil Compositions

The one or more ashless antiwear additives described above may be combined with a major amount of a base oil or base oil blend of lubricating viscosity (as described below) in combination with one or more further optional additives to produce a lubricating oil composition. In approaches, the lubricating oil compositions includes about 50 weight percent or more of the base oil blend, about 60 weight percent or more, about 70 weight percent or more, or about 80 weight percent or more to about 95 weight percent or less, about 90 weight percent or less, about 85 weight percent or less of the base oil blend as such blend is further discussed below. The lubricating compositions herein may have a KV100 of about 2 to about 15 cSt (ASTM D445), and preferably, about 5 to about 12 cSt, and more preferably 5 to about 10 cSt.

Base Oil Blend: The base oil used in the lubricating oil compositions herein may be oils of lubricating viscosity and selected from any of the base oils in Groups I-V as specified in the American Petroleum Institute (API) Base Oil Interchangeability Guidelines. The five base oil groups are as follows:

TABLE 1

| Base oil Category | Sulfur (%) | | Saturates (%) | Viscosity Index |
|---|---|---|---|---|
| Group I | >0.03 | and/or | <90 | 80 to 120 |
| Group II | <0.03 | and | >90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry. Group II+ may comprise high viscosity index Group II.

The base oil blend used in the disclosed lubricating oil composition may be a mineral oil, animal oil, vegetable oil, synthetic oil, synthetic oil blends, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity present may be the balance remaining after subtracting from 100 wt % the sum of the amount of the performance additives inclusive of viscosity index improver(s) and/or pour point depressant(s) and/or other top treat additives. For example, the oil of lubricating viscosity that may be present in a finished fluid may be a major amount, such as greater than about 50 wt %, greater than about 60 wt %, greater than about 70 wt %, greater than about 80 wt %, greater than about 85 wt %, or greater than about 90 wt %.

Optional Additives:

The lubricating oil compositions herein may also include a number of optional additives combined with the acyclic rust or corrosion inhibitors discussed above as needed to meet performance standards so long as the noted relationships for the sulfated ash and composition of the rust or corrosion inhibitors discussed above is maintained. Those optional additives are described in the following paragraphs.

Dispersants: The lubricating oil composition may optionally include one or more dispersants or mixtures thereof. Dispersants are often known as ashless-type dispersants because, prior to mixing in a lubricating oil composition, they do not contain ash-forming metals and they do not normally contribute any ash when added to a lubricant. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include polyisobutylene succinimide with the number average molecular weight of the polyisobutylene substituent being in the range about 350 to about 50,000, or to about 5,000, or to about 3,000, as measured by GPC. Succinimide dispersants and their preparation are disclosed, for instance in U.S. Pat. No. 7,897,696 or U.S. Pat. No. 4,234,435. The alkenyl substituent may be prepared from polymerizable monomers containing about 2 to about 16, or about 2 to about 8, or about 2 to about 6 carbon atoms. Succinimide dispersants are typically the imide formed from a polyamine, typically a poly(ethyleneamine).

Preferred amines are selected from polyamines and hydroxyamines. Examples of polyamines that may be used include, but are not limited to, diethylene triamine (DETA), triethylene tetramine (TETA), tetraethylene pentamine (TEPA), and higher homologues such as pentaethylamine hexamine (PEHA), and the like.

A suitable heavy polyamine is a mixture of polyalkylene-polyamines comprising small amounts of lower polyamine oligomers such as TEPA and PEHA (pentaethylene hexamine) but primarily oligomers with 6 or more nitrogen atoms, 2 or more primary amines per molecule, and more extensive branching than conventional polyamine mixtures. A heavy polyamine preferably includes polyamine oligomers containing 7 or more nitrogen atoms per molecule and with 2 or more primary amines per molecule. The heavy polyamine comprises more than 28 wt. % (e.g. >32 wt. %) total nitrogen and an equivalent weight of primary amine groups of 120-160 grams per equivalent.

In some approaches, suitable polyamines are commonly known as PAM and contain a mixture of ethylene amines where TEPA and pentaethylene hexamine (PEHA) are the major part of the polyamine, usually less than about 80%.

Typically, PAM has 8.7-8.9 milliequivalents of primary amine per gram (an equivalent weight of 115 to 112 grams per equivalent of primary amine) and a total nitrogen content of about 33-34 wt. %. Heavier cuts of PAM oligomers with practically no TEPA and only very small amounts of PEHA but containing primarily oligomers with more than 6 nitrogen atoms and more extensive branching, may produce dispersants with improved dispersancy.

In an embodiment the present disclosure further comprises at least one polyisobutylene succinimide dispersant derived from polyisobutylene with a number average molecular weight in the range about 350 to about 50,000, or to about 5000, or to about 3000, as determined by GPC. The polyisobutylene succinimide may be used alone or in combination with other dispersants.

In some embodiments, polyisobutylene, when included, may have greater than 50 mol %, greater than 60 mol %, greater than 70 mol %, greater than 80 mol %, or greater than 90 mol % content of terminal double bonds. Such PIB is also referred to as highly reactive PIB ("HR-PIB"). HR-PIB having a number average molecular weight ranging from about 800 to about 5000, as determined by GPC, is suitable for use in embodiments of the present disclosure. Conventional PIB typically has less than 50 mol %, less than 40 mol %, less than 30 mol %, less than 20 mol %, or less than 10 mol % content of terminal double bonds.

An HR-PIB having a number average molecular weight ranging from about 900 to about 3000 may be suitable, as determined by GPC. Such HR-PIB is commercially available, or can be synthesized by the polymerization of isobutene in the presence of a non-chlorinated catalyst such as boron trifluoride, as described in U.S. Pat. No. 4,152,499 to Boerzel, et al. and U.S. Pat. No. 5,739,355 to Gateau, et al. When used in the aforementioned thermal ene reaction, HR-PIB may lead to higher conversion rates in the reaction, as well as lower amounts of sediment formation, due to increased reactivity. A suitable method is described in U.S. Pat. No. 7,897,696.

In one embodiment, the present disclosure further comprises at least one dispersant derived from polyisobutylene succinic anhydride ("PIBSA"). The PIBSA may have an average of between about 1.0 and about 2.0 succinic acid moieties per polymer.

The % actives of the alkenyl or alkyl succinic anhydride can be determined using a chromatographic technique. This method is described in column 5 and 6 in U.S. Pat. No. 5,334,321.

The percent conversion of the polyolefin is calculated from the % actives using the equation in column 5 and 6 in U.S. Pat. No. 5,334,321.

Unless stated otherwise, all percentages are in weight percent and all molecular weights are number average molecular weights determined by gel permeation chromatography (GPC) using commercially available polystyrene standards (with a number average molecular weight of 180 to about 18,000 as the calibration reference).

In one embodiment, the dispersant may be derived from a polyalphaolefin (PAO) succinic anhydride. In one embodiment, the dispersant may be derived from olefin maleic anhydride copolymer. As an example, the dispersant may be described as a poly-PIBSA. In an embodiment, the dispersant may be derived from an anhydride which is grafted to an ethylene-propylene copolymer.

A suitable class of nitrogen-containing dispersants may be derived from olefin copolymers (OCP), more specifically, ethylene-propylene dispersants which may be grafted with maleic anhydride. A more complete list of nitrogen-containing compounds that can be reacted with the functionalized OCP are described in U.S. Pat. Nos. 7,485,603; 7,786,057; 7,253,231; 6,107,257; and 5,075,383; and/or are commercially available.

One class of suitable dispersants may also be Mannich bases. Mannich bases are materials that are formed by the condensation of a higher molecular weight, alkyl substituted phenol, a polyalkylene polyamine, and an aldehyde such as formaldehyde. Mannich bases are described in more detail in U.S. Pat. No. 3,634,515.

A suitable class of dispersants may also be high molecular weight esters or half ester amides. A suitable dispersant may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, carbonates, cyclic carbonates, hindered phenolic esters, and phosphorus compounds. U.S. Pat. Nos. 7,645,726; 7,214,649; and 8,048,831 are incorporated herein by reference in their entireties.

In addition to the carbonate and boric acids post-treatments both the compounds may be post-treated, or further post-treatment, with a variety of post-treatments designed to improve or impart different properties. Such post-treatments include those summarized in columns 27-29 of U.S. Pat. No. 5,241,003, hereby incorporated by reference. Such treatments include, treatment with: Inorganic phosphorous acids or anhydrates (e.g., U.S. Pat. Nos. 3,403,102 and 4,648,980); Organic phosphorous compounds (e.g., U.S. Pat. No. 3,502,677); Phosphorous pentasulfides; Boron compounds as already noted above (e.g., U.S. Pat. Nos. 3,178,663 and 4,652,387); Carboxylic acid, polycarboxylic acids, anhydrides and/or acid halides (e.g., U.S. Pat. Nos. 3,708,522 and 4,948,386); Epoxides polyepoxiates or thioexpoxides (e.g., U.S. Pat. Nos. 3,859,318 and 5,026,495); Aldehyde or ketone (e.g., U.S. Pat. No. 3,458,530); Carbon disulfide (e.g., U.S. Pat. No. 3,256,185); Glycidol (e.g., U.S. Pat. No. 4,617,137); Urea, thiourea or guanidine (e.g., U.S. Pat. Nos. 3,312,619; 3,865,813; and British Patent GB 1,065,595); Organic sulfonic acid (e.g., U.S. Pat. No. 3,189,544 and British Patent GB 2,140,811); Alkenyl cyanide (e.g., U.S. Pat. Nos. 3,278,550 and 3,366,569); Diketene (e.g., U.S. Pat. No. 3,546,243); A diisocyanate (e.g., U.S. Pat. No. 3,573,205); Alkane sultone (e.g., U.S. Pat. No. 3,749,695); 1,3-Dicarbonyl Compound (e.g., U.S. Pat. No. 4,579,675); Sulfate of alkoxylated alcohol or phenol (e.g., U.S. Pat. No. 3,954,639); Cyclic lactone (e.g., U.S. Pat. Nos. 4,617,138; 4,645,515; 4,668,246; 4,963,275; and 4,971,711); Cyclic carbonate or thiocarbonate linear monocarbonate or polycarbonate, or chloroformate (e.g., U.S. Pat. Nos. 4,612,132; 4,647,390; 4,648,886; 4,670,170); Nitrogen-containing carboxylic acid (e.g., U.S. Pat. No. 4,971,598 and British Patent GB 2,140,811); Hydroxy-protected chlorodicarbonyloxy compound (e.g., U.S. Pat. No. 4,614,522); Lactam, thiolactam, thiolactone or dithiolactone (e.g., U.S. Pat. Nos. 4,614,603 and 4,666,460); Cyclic carbonate or thiocarbonate, linear monocarbonate or polycarbonate, or chloroformate (e.g., U.S. Pat. Nos. 4,612,132; 4,647,390; 4,646,860; and 4,670,170); Nitrogen-containing carboxylic acid (e.g., U.S. Pat. No. 4,971,598 and British Patent GB 2,440,811); Hydroxy-protected chlorodicarbonyloxy compound (e.g., U.S. Pat. No. 4,614,522); Lactam, thiolactam, thiolactone or dithiolactone (e.g., U.S. Pat. Nos. 4,614,603, and 4,666,460); Cyclic carbamate, cyclic thiocarbamate or cyclic dithiocarbamate (e.g., U.S. Pat. Nos. 4,663,062 and 4,666,459); Hydroxyaliphatic carboxylic acid (e.g., U.S. Pat. Nos. 4,482,464; 4,521,318; 4,713,189); Oxidizing agent (e.g., U.S. Pat. No. 4,379,064); Combination of phosphorus pentasulfide and a polyalkylene polyamine (e.g., U.S. Pat. No. 3,185,647); Combination of carboxylic acid or an aldehyde or ketone and sulfur or sulfur chloride (e.g., U.S. Pat. Nos. 3,390,086; 3,470,098); Combination of a hydrazine and carbon disulfide (e.g. U.S. Pat. No. 3,519,564); Combination of an aldehyde and a phenol (e.g., U.S. Pat. Nos. 3,649,229; 5,030,249; 5,039,307); Combination of an aldehyde and an O-diester of dithiophosphoric acid (e.g., U.S. Pat. No. 3,865,740); Combination of a hydroxyaliphatic carboxylic acid and a boric acid (e.g., U.S. Pat. No. 4,554,086); Combination of a hydroxyaliphatic carboxylic acid, then formaldehyde and a phenol (e.g., U.S. Pat. No. 4,636,322); Combination of a hydroxyaliphatic carboxylic acid and then an aliphatic dicarboxylic acid (e.g., U.S. Pat. No. 4,663,064); Combination of formaldehyde and a phenol and then glycolic acid (e.g., U.S. Pat. No. 4,699,724); Combination of a hydroxyaliphatic carboxylic acid or oxalic acid and then a diisocyanate (e.g. U.S. Pat. No. 4,713,191); Combination of inorganic acid or anhydride of phosphorus or a partial or total sulfur analog thereof and a boron compound (e.g., U.S. Pat. No. 4,857,214); Combination of an organic diacid then an unsaturated fatty acid and then a nitrosoaromatic amine optionally followed by a boron compound and then a glycolating agent (e.g., U.S. Pat. No. 4,973,412); Combination of an aldehyde and a triazole (e.g., U.S. Pat. No. 4,963,278); Combination of an aldehyde and a triazole then a boron compound (e.g., U.S. Pat. No. 4,981,492); Combination of cyclic lactone and a boron compound (e.g., U.S. Pat. Nos. 4,963,275 and 4,971,711). The above-mentioned patents are herein incorporated in their entireties.

The TBN of a suitable dispersant may be from about 10 to about 65 mg KOH/g dispersant, on an oil-free basis, which is comparable to about 5 to about 30 TBN if measured on a dispersant sample containing about 50% diluent oil. TBN is measured by the method of ASTM D2896.

In yet other embodiments, the optional dispersant additive may be a hydrocarbyl substituted succinamide or succinimide dispersant. In approaches, the hydrocarbyl substituted succinamide or succinimide dispersant may be derived from a hydrocarbyl substituted acylating agent reacted with a polyalkylene polyamine and wherein the hydrocarbyl substituent of the succinamide or the succinimide dispersant is a linear or branched hydrocarbyl group having a number average molecular weight of about 250 to about 5,000 as measured by GPC using polystyrene as a calibration reference.

In some approaches, the polyalkylene polyamine used to form the dispersant has the Formula

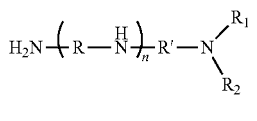

wherein each R and R', independently, is a divalent C1 to C6 alkylene linker, each $R_1$ and $R_2$, independently, is hydrogen, a C1 to C6 alkyl group, or together with the nitrogen atom to which they are attached form a 5- or 6-membered ring optionally fused with one or more aromatic or non-aromatic rings, and n is an integer from 0 to 8. In other approaches, the polyalkylene polyamine is selected from the group consisting of a mixture of polyethylene polyamines having an average of 5 to 7 nitrogen atoms, triethylenetetramine, tetraethylenepentamine, and combinations thereof.

The dispersant, if present, can be used in an amount sufficient to provide up to about 20 wt %, based upon the final weight of the lubricating oil composition. Another amount of the dispersant that can be used may be about 0.1 wt % to about 15 wt %, or about 0.1 wt % to about 10 wt %, about 0.1 to 8 wt %, or about 1 wt % to about 10 wt %, or about 1 wt % to about 8 wt %, or about 1 wt % to about 6 wt %, based upon the final weight of the lubricating oil composition. In some embodiments, the lubricating oil composition utilizes a mixed dispersant system. A single type or a mixture of two or more types of dispersants in any desired ratio may be used.

Antioxidants: The lubricating oil compositions herein also may optionally contain antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox™ L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox™ 4716 available from Albemarle Corporation.

Useful antioxidants may include diarylamines and high molecular weight phenols. In an embodiment, the lubricating oil composition may contain a mixture of a diarylamine and a high molecular weight phenol, such that each antioxidant may be present in an amount sufficient to provide up to about 5%, by weight, based upon the final weight of the lubricating oil composition. In an embodiment, the antioxidant may be a mixture of about 0.3 to about 1.5% diarylamine and about 0.4 to about 2.5% high molecular weight phenol, by weight, based upon the final weight of the lubricating oil composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as $\alpha$-olefins.

In another alternative embodiment the antioxidant composition also contains a molybdenum-containing antioxidant in addition to the phenolic and/or aminic antioxidants discussed above. When a combination of these three antioxidants is used, preferably the ratio of phenolic to aminic to molybdenum-containing is (0 to 2):(0 to 2):(0 to 1).

The one or more antioxidant(s) may be present in ranges about 0 wt % to about 20 wt %, or about 0.1 wt % to about 10 wt %, or about 1 wt % to about 5 wt %, of the lubricating oil composition.

Boron-Containing Compounds: The lubricating oil compositions herein may optionally contain one or more boron-containing compounds. Examples of boron-containing compounds include borate esters, borated fatty amines, borated epoxides, borated detergents, and borated dispersants, such as borated succinimide dispersants, as disclosed in U.S. Pat. No. 5,883,057. The boron-containing compound, if present, can be used in an amount sufficient to provide up to about 8 wt %, about 0.01 wt % to about 7 wt %, about 0.05 wt % to about 5 wt %, or about 0.1 wt % to about 3 wt % of the lubricating oil composition.

Detergents: The lubricating oil composition may optionally include one or more additional neutral, low based, or overbased detergents, or mixtures thereof. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein.

The detergent substrate may be salted with an alkali or alkaline earth metal such as, but not limited to, calcium, magnesium, potassium, sodium, lithium, barium, or mixtures thereof. In some embodiments, the detergent is free of barium. In some embodiments, a detergent may contain traces of other metals such as magnesium or calcium in amounts such as 50 ppm or less, 40 ppm or less, 30 ppm or less, 20 ppm or less, or 10 ppm or less. A suitable detergent may include alkali or alkaline earth metal salts of petroleum sulfonic acids and long chain mono- or di-alkylarylsulfonic acids with the aryl group being benzyl, tolyl, and xylyl. Examples of suitable detergents include, but are not limited to, calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium monoand/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

An overbased detergent of the lubricating oil composition may have a total base number (TBN) of about 200 mg KOH/gram or greater, or as further examples, about 250 mg KOH/gram or greater, or about 350 mg KOH/gram or greater, or about 375 mg KOH/gram or greater, or about 400 mg KOH/gram or greater.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased calcium phenate detergents have a total base number of at least about 150 mg KOH/g, at least about 225 mg KOH/g, at least about 225 mg KOH/g to about 400 mg KOH/g, at least about 225 mg KOH/g to about 350 mg KOH/g or about 230 mg KOH/g to about 350 mg KOH/g, all as measured by the method of ASTM D-2896. When such detergent compositions are formed in an inert diluent, e.g. a process oil, usually a mineral oil, the total base number reflects the basicity of the overall composition including diluent, and any other materials (e.g., promoter, etc.) that may be contained in the detergent composition.

The overbased detergent may have a metal to substrate ratio of from 1.1:1, or from 2:1, or from 4:1, or from 5:1, or from 7:1, or from 10:1. In some embodiments, a detergent is effective at reducing or preventing rust in an engine or other automotive part such as a transmission or gear. The detergent may be present in a lubricating composition at about 0 wt % to about 10 wt %, or about 0.1 wt % to about 8 wt %, or about 1 wt % to about 4 wt %, or greater than about 4 wt % to about 8 wt %.

Extreme Pressure Agents: The lubricating oil compositions herein may optionally contain one or more extreme pressure agents. Extreme Pressure (EP) agents that are soluble in the oil include sulfur- and chlorosulfur-containing EP agents, chlorinated hydrocarbon EP agents and phosphorus EP agents. Examples of such EP agents include chlorinated wax; organic sulfides and polysulfides such as dibenzyldisulfide, bis(chlorobenzyl) disulfide, dibutyl tetrasulfide, sulfurized methyl ester of oleic acid, sulfurized alkyl phenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbyl and trihydrocarbyl phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenyl phosphite; metal thiocarbamates such as zinc dioctyldithiocarbamate and barium heptylphenol diacid; amine salts of alkyl and dialkylphosphoric acids, including, for example, the amine salt of the reaction product of a dialkyldithiophosphoric acid with propylene oxide; and mixtures thereof.

Friction Modifiers: The lubricating oil compositions herein may optionally contain one or more friction modifiers. Suitable friction modifiers may comprise metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanadine, alkanolamides, phosphonates, metal-containing compounds, glycerol esters, sulfurized fatty compounds and olefins, sunflower oil other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a diester, or a (tri)glyceride. The friction modifier may be a long chain fatty amide, a long chain fatty ester, a long chain fatty epoxide derivatives, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

A friction modifier may optionally be present in ranges such as about 0 wt % to about 10 wt %, or about 0.01 wt % to about 8 wt %, or about 0.1 wt % to about 4 wt %.

Molybdenum-containing component: The lubricating oil compositions herein may optionally contain one or more molybdenum-containing compounds. An oil-soluble molybdenum compound may have the functional performance of an antiwear agent, an antioxidant, a friction modifier, or mixtures thereof. An oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan® 822™, Molyvan®™ A, Molyvan® 2000 and Molyvan® 855, and Molyvan® 1055 from R. T. Vanderbilt Co., Ltd., and Sakura-Lube™ S-165, S-200, S-300, S-310G, S-151, S-525, S-600, S-700, and S-710 available from Adeka Corporation, and mixtures thereof. Suitable molybdenum components are described in U.S. Pat. No. 5,650,381; US RE 37,363 E1; US RE 38,929 E1; and US RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, MoOCl4, MoO2Br2, Mo2O3Cl6, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula Mo3SkLnQz and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-containing compounds: In another embodiment, the lubricants herein may optionally include a transition metal containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, an oil-soluble transition metal-containing compound may function as antiwear agents, friction modifiers, antioxidants, deposit control additives, or more than one of these functions. In an embodiment the oil-soluble transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato) isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl-(or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl-(or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, 1 part (by mole) of tetraisopropyl titanate may be reacted with about 2 parts (by mole) of a polyisobutene-substituted succinic anhydride at 140-150° C. for 5 to 6 hours to provide a titanium modified dispersant or intermediate. The resulting material (30 g) may be further reacted with a succinimide dispersant from polyisobutene-substituted succinic anhydride and a polyethylenepolyamine mixture (127 grams+diluent oil) at 150° C. for 1.5 hours, to produce a titanium-modified succinimide dispersant.

Another titanium containing compound may be a reaction product of titanium alkoxide and C6 to C25 carboxylic acid. The reaction product may be represented by the following formula:

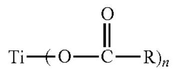

wherein n is an integer selected from 2, 3 and 4, and R is a hydrocarbyl group containing from about 5 to about 24 carbon atoms, or by the formula:

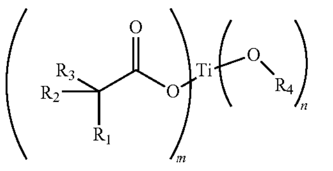

wherein m+n=4 and n ranges from 1 to 3, $R_4$ is an alkyl moiety with carbon atoms ranging from 1-8, $R_1$ is selected from a hydrocarbyl group containing from about 6 to 25 carbon atoms, and $R_2$ and $R_3$ are the same or different and are selected from a hydrocarbyl group containing from about 1 to 6 carbon atoms, or the titanium compound may be represented by the formula:

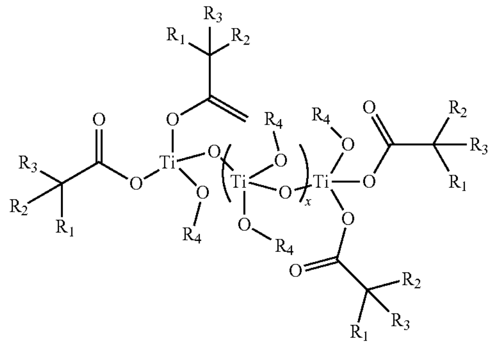

wherein x ranges from 0 to 3, $R_1$ is selected from a hydrocarbyl group containing from about 6 to 25 carbon atoms, $R_2$, and $R_3$ are the same or different and are selected from a hydrocarbyl group containing from about 1 to 6 carbon atoms, and $R_4$ is selected from a group consisting of either H, or C6 to C25 carboxylic acid moiety.

Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Viscosity Index Improvers: The lubricating oil compositions herein may optionally contain one or more viscosity index improvers. Suitable viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Viscosity index improvers may include star polymers and suitable examples are described in US Publication No. 20120101017A1.

The lubricating oil compositions herein may optionally contain one or more dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of viscosity index improver and/or dispersant viscosity index improver may be about 0 wt % to about 20 wt %, about 0.1 wt % to about 15 wt %, about 0.1 wt % to about 12 wt %, or about 0.5 wt % to about 10 wt %, of the lubricating oil composition.

Other Optional Additives: Other additives may be selected to perform one or more functions required of a lubricating fluid. Further, one or more of the mentioned additives may be multi-functional and provide functions in addition to or other than the function prescribed herein. The other performance additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these performance additives.

Suitable metal deactivators may include derivatives of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 wt % to about 1 wt %, about 0.01 wt % to about 0.5 wt %, or about 0.02 wt % to about 0.04 wt % based upon the final weight of the lubricating oil composition.

Suitable additional rust inhibitors may be a single compound or a mixture of compounds having the property of inhibiting corrosion of ferrous metal surfaces. Additional rust inhibitors may be provided so long as they do not conflict with the selected corrosion inhibitors discussed above. Non-limiting examples of rust inhibitors, in addition to those described above, include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid.

The rust inhibitor, if present, can be used in an amount sufficient to provide about 0 wt % to about 5 wt %, about 0.01 wt % to about 3 wt %, about 0.1 wt % to about 2 wt %, based upon the final weight of the lubricating oil composition.

In general terms, a suitable lubricant herein may include additive components in the ranges listed in the following table.

TABLE 2

Suitable Low-Ash Lubricating Compositions

| Component | Wt. % (Suitable Embodiments) | Wt. % (Suitable Embodiments) |
|---|---|---|
| Ashless Antiwear Additive | 0.1-10 | 0.2-3.0 |
| Dispersant(s) | 1.0-8.0 | 2.5-5.5 |
| Antioxidant(s) | 0.3-4.0 | 0.5-3.0 |
| Detergent(s) | 0.5-4.0 | 0.75-3.0 |
| Metal-containing Antiwear (e.g., ZDDP) | 0-2.0 | 0-1.5 |
| Ashless TBN booster(s) | 0.0-1.0 | 0.01-0.5 |
| Other Corrosion inhibitor(s) | 0.0-5.0 | 0.0-2.0 |
| Antifoaming agent(s) | 0.0-5.0 | 0.001-0.15 |
| Antiwear agent(s) | 0.0-1.0 | 0.0-0.8 |
| Pour point depressant(s) | 0.0-5.0 | 0.01-1.5 |
| Viscosity index improver(s) | 0.0-25.0 | 0.1-15.0 |
| Dispersant viscosity index improver(s) | 0.0-10.0 | 0.0-5.0 |
| Friction modifier(s) | 0.0-5.0 | 0.01-2.0 |
| Base oil | Balance | Balance |
| Total | 100 | 100 |

The percentages of each component above represent the weight percent of each component, based upon the weight of the final lubricating oil composition. The remainder of the lubricating oil composition consists of one or more base oils. Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). Fully formulated lubricants conventionally contain an additive package, referred to herein as a dispersant/inhibitor package or DI package, that will supply the characteristics that are required in the formulation.

Lubricants herein are configured for use in various types of lubricants, such as automotive lubricants and/or greases, internal combustion engine oils, hybrid engine oils, electric engine lubricants, drivetrain lubricants, transmission lubricants, gear oils, hydraulic lubricants, tractor hydraulic fluids, metal working fluids, turbine engine lubricants, stationary engine lubricants, tractor lubricants, motorcycle lubricants, power steering fluids, clutch fluids, axles fluids, wet break fluids, and the like. Suitable engine types may include, but are not limited to heavy-duty diesel, passenger car, light duty diesel, medium speed diesel, or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression-ignited engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines. Engines may be coupled with a turbocharger.

Further, lubricants of the present description may be suitable to meet one or more industry specification requirements such as ILSAC GF-3, GF-4, GF-5, GF-6, PC-11, CF, CF-4, CH-4, CK-4, FA-4, CJ-4, CI-4 Plus, CI-4, API SG, SJ, SL, SM, SN, SN PLUS, ACEA A1/B1, A2/B2, A3/B3, A3/B4, A5/B5, A7/B7, C1, C2, C3, C4, C5, C6, E4/E6/E7/E9, Euro 5/6, JASO DL-1, Low SAPS, Mid SAPS, or original equipment manufacturer specifications such as Dexos1™, Dexos2™, MB-Approval 229.1, 229.3, 229.5, 229.51/229.31, 229.52, 229.6, 229.71, 226.5, 226.51, 228.0/.1, 228.2/.3, 228.31, 228.5, 228.51, 228.61, VW 501.01, 502.00, 503.00/503.01, 504.00, 505.00, 505.01, 506.00/506.01, 507.00, 508.00, 509.00, 508.88, 509.99, BMW Longlife-01, Longlife-01 FE, Longlife-04, Longlife-12 FE, Longlife-14 FE+, Longlife-17 FE+, Porsche A40, C30, Peugeot Citroën Automobiles B71 2290, B71 2294, B71 2295, B71 2296, B71 2297, B71 2300, B71 2302, B71 2312, B71 2007, B71 2008, Renault RN0700, RN0710, RN0720, Ford WSS-M2C153-H, WSS-M2C930-A, WSS-M2C945-A, WSS-M2C913A, WSS-M2C913-B, WSS-M2C913-C, WSS-M2C913-D, WSS-M2C948-B, WSS-M2C948-A, GM 6094-M, Chrysler MS-6395, Fiat 9.55535 G1, G2, M2, N1, N2, Z2, S1, S2, S3, S4, T2, DS1, DSX, GH2, GS1, GSX, CR1, Jaguar Land Rover STJLR.03.5003, STJLR.03.5004, STJLR.03.5005, STJLR.03.5006, STJLR.03.5007, STJLR.51.5122 or any past or future PCMO or HDD specifications not mentioned herein. In some embodiments for passenger car motor oil (PCMO) applications, the amount of phosphorus in the finished fluid is 1000 ppm or less or 900 ppm or less or 800 ppm or less.

SELECTED DEFINITIONS

The following exemplary definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," "lubricant," "crankcase oil," "crankcase lubricant," "engine oil," "engine lubricant," "motor oil," and "motor lubricant" are considered synonymous, fully interchangeable terminology referring to the finished lubrication product comprising a major amount of a base oil plus a minor amount of an additive composition.

As used herein, the terms "additive package," "additive concentrate," "additive composition," "engine oil additive package," "engine oil additive concentrate," "crankcase additive package," "crankcase additive concentrate," "motor oil additive package," "motor oil concentrate," are considered synonymous, fully interchangeable terminology referring the portion of the lubricating oil composition excluding the major amount of base oil stock mixture. The additive package may or may not include the viscosity index improver or pour point depressant.

The term "overbased" relates to metal salts, such as metal salts of sulfonates, carboxylates, salicylates, and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, MR, is greater than one. They are commonly referred to as overbased, hyperbased, or superbased salts and may be salts of organic sulfur acids, carboxylic acids, salicylates, sulfonates, and/or phenols.

The term "alkaline earth metal" relates to calcium, barium, magnesium, and strontium, and the term "alkali metal" refers to lithium, sodium, potassium, rubidium, and cesium.

As used herein, the term "hydrocarbyl" or "hydrocarbyl substituent" or "hydrocarbyl group" is used in its ordinary sense, which is well-known to those skilled in the art. Specifically, it refers to a group having a carbon atom directly attached to the remainder of the molecule and having a predominantly hydrocarbon character. Each hydrocarbyl group is independently selected from hydrocarbon substituents, and substituted hydrocarbon substituents containing one or more of halo groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents are present for every ten carbon atoms in the hydrocarbyl group.

As used herein, the term "hydrocarbylene substituent" or "hydrocarbylene group" is used in its ordinary sense, which is well-known to those skilled in the art. Specifically, it refers to a group that is directly attached at two locations of the molecule to the remainder of the molecule by a carbon atom and having predominantly hydrocarbon character. Each hydrocarbylene group is independently selected from divalent hydrocarbon substituents, and substituted divalent hydrocarbon substituents containing halo groups, alkyl groups, aryl groups, alkylaryl groups, arylalkyl groups, hydroxyl groups, alkoxy groups, mercapto groups, nitro groups, nitroso groups, amino groups, pyridyl groups, furyl groups, imidazolyl groups, oxygen and nitrogen, and wherein no more than two non-hydrocarbon substituents is present for every ten carbon atoms in the hydrocarbylene group.

As used herein, the term "percent by weight", unless expressly stated otherwise, means the percentage the recited component represents to the weight of the entire composition.

As used herein, the term "ppm" or "ppmw," unless expressly stated otherwise, refers to parts per million based on weight.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of ASTM D2896.

The term "alkyl" as employed herein refers to straight, branched, cyclic, and/or substituted saturated chain moieties of from about 1 to about 100 carbon atoms. The term "alkenyl" as employed herein refers to straight, branched, cyclic, and/or substituted unsaturated chain moieties of from about 3 to about 10 carbon atoms. The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

As used herein, "post-reacted" or "post-treated" refers to a component that is further reacted with or treated with, for example, a boron, phosphorus, and/or maleic anhydride and may refer to dispersants in which primary and/or secondary amines are further reacted with such compounds to convert at least a portion of such amines to tertiary amines. Such subsequent reactions or treatments are further described in U.S. Pat. No. 5,241,003, which is incorporated herein by reference. Conversely, components that are "not post-reacted" or "not post-treated" have not been subjected to such further processing, reactions, and/or treatments and, in the context of dispersants, include a certain amount of primary and/or secondary amines.

The molecular weight for any embodiment herein may be determined with a gel permeation chromatography (GPC) instrument obtained from Waters or the like instrument and the data processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5μ, and pore size ranging from 100-10000 Å) with the column temperature at about 40° C. Un-stabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THF and prepared at concentration of 0.1 to 0.5 wt. % and used without filtration.

GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

As used herein, "sulfated ash" or "SASH" refers to the amount of sulfated ash as measured using ASTM D874. Alternatively, sulfated ash may also be calculated based on the amount of metals in the lubricant. For example, sulfated ash (SASH) may optionally be calculated based on the total metallic elements that contribute to SASH in the lubricant composition adjusted by factors for each metallic type. The metals that contribute to SASH include (along with the adjustment factor) barium (1.7), boron (3.22), calcium (3.4), copper (1.252), lead (1.464), lithium (7.92), magnesium (4.95), manganese (1.291), molybdenum (1.5), potassium (2.33), sodium (3.09), and zinc (1.5). Specifically, the ppmw content of each of the metallic elements present in a lubricating oil composition that is considered to contribute to sulfated ash is multiplied by its corresponding factor above; then, the product for each metallic element/factor adjustment is summed and the total is divided by 10,000 to calculate the weight percent of SASH in the lubricating compositions. Unless specified otherwise, all sulfated ash levels herein are measured using ASTM D874.

EXAMPLES

The following examples are illustrative of exemplary embodiments of the disclosure. In these examples, as well as elsewhere in this application, all ratios, parts, and percentages are by weight unless otherwise indicated. It is intended that these examples are being presented for the purpose of illustration only and are not intended to limit the scope of the invention disclosed herein.

Example 1

Various ashless antiwear additives in the form of a triester of a dithiophosphate were prepared by reacting a starting alcohol with phosphorus pentasulfide and then reacting with an organic compound as follows: First, the selected alcohol was charged to a stainless-steel reactor and then a first charge of phosphorus pentasulfide (P2S5) was charged slowly to maintain the temperature in the range at about 30° C. to about 60° C. under vigorous stirring. Next, a second charge of phosphorus pentasulfide was added to the reactor followed by slowly adding a second charge of the selected alcohol to maintain the reaction temperature below about 70° C. After completing the second alcohol charge, the reaction temperature was increased to about 80° C. to about 85° C. for about 60 minutes to form a thiophosphoric acid. Next, the thiophosphoric acid was charged to a stainless steel reactor and heated to about 55° C. Then, the selected organic compound was charged slowly to maintain the reaction temperature below about 75° C. After the addition of selected organic compound, the reaction proceeded at about 85° C. for about two hours, and then vacuum stripped to produce the triester of a dithiophosphate. Table 3 below provides inventive and comparative ashless antiwear additives.

TABLE 3

| Sample | Alcohol (oxygen ester) | Organic Compound (sulfur ester) | β-hydrogens in Oxygen ester Moiety | MW | % P |
|---|---|---|---|---|---|
| A | 4-methyl-2-pentyl | Vinyl acetate | 5 | 399 | 7.8% |
| B | 4-methyl-2-pentyl | 1-octanol | 5 | 411 | 7.5% |
| C | 4-methyl-2-pentyl | Diethyl maleate | 5 | 470 | 6.6% |
| D | 4-methyl-2-pentyl | Vinyl stearate | 5 | 609 | 5.1% |
| E | 2-ethyl hexyl | Diethyl maleate | 1 | 526 | 5.9% |
| F | 4-methyl-2-pentyl | Dibutyl maleate | 5 | 527 | 5.9% |

Example 2

The ashless antiwear additives A-F of Table 3 from Example 1 above were used in a zinc-free and low-ash lubricants and evaluated for wear performance pursuant to the Sequence IVA test procedure of ASTM D6891 and phosphorus retention pursuant to the sequence IIIH/B test procedure of ASTM D8111. The lubricants included the amounts of the ashless antiwear additives of Table 4 below and included the same amounts of process oil, antifoam additive, antiwear additive, dispersants, viscosity modifier additive, pour point depressant, and base oil to form lubricants having a KV100 of about 8.9 to about 9.2 cSt (ASTM D445). The evaluated lubricants of this Example each had no more than about 10 ppm of zinc and SASH level of no more than about 0.5 weight percent (ASTM D874) providing the lubricants having the elemental amounts of Table 5.

TABLE 4

| Ashless Antiwear of Example 1 | Compare 1 | Compare 2 | Compare 3 | Inventive 1 | Compare 4 | Inventive 2 |
|---|---|---|---|---|---|---|
| A | 1.03% | | | | | |
| B | | 1.06% | | | | |
| C | | | 1.2% | | | |
| D | | | | 1.4% | | |
| E | | | | | 1.2% | |
| F | | | | | | 1.2% |

Passing lubricants exhibit no more than 90 microns of camshaft wear pursuant to ASTM D6891 and at least about 81 percent of phosphorus retention pursuant to ASTM D8111. Results are provided in Table 6 below.

TABLE 5

| | | Compare 1 | Compare 2 | Compare 3 | Inventive 1 | Compare 4 | Inventive 2 |
|---|---|---|---|---|---|---|---|
| Boron | ppm | 78 | 84 | 88 | 85 | 81 | 75 |
| Phosphorus | ppm | 816 | 801 | 739 | 656 | 660 | 641 |
| Nitrogen | ppm | 1280 | 1250 | 1280 | 1310 | 1300 | 1400 |
| Zinc | ppm | 0 | 0 | 0 | 0 | 0 | 0 |
| Calcium | ppm | 1257 | 1246 | 1260 | 1231 | 1217 | 1236 |
| Magnesium | ppm | 0 | 0 | 0 | 0 | 0 | 0 |
| SASH (D874) | wt % | 0.45 | 0.45 | 0.46 | 0.45 | 0.44 | 0.44 |
| KV100 (D445) | cSt | 9.0 | 9.0 | 9.0 | 9.2 | 9.0 | 9.1 |

TABLE 6

| | | | Compare 1 | Compare 2 | Compare 3 | Inventive 1 | Compare 4 | Inventive 2 |
|---|---|---|---|---|---|---|---|---|
| IVA | D6891 | <90 microns | 23.4 | 127.9 | 17.6 | NA | 157.6 | 56.4 |
| IIIH/B | D8111 | >81% | 35.1% FAIL | 43.5% FAIL | 71.8% FAIL | 94.7% PASS | 87.7% FAIL | 89.5% PASS |

As shown in Tables 4-6 above, only lubricants including the ashless antiwear compounds having the selected oxygen ester moieties with the required β-hydrogens coupled with the selected sulfur ester moieties to achieve the minimum total molecular weight attain passing performance on both the Sequence IVA (wear) and Sequence IIIH/B (phosphorus retention) performance tests. Comparative antiwear additives fails one or more of the wear or phosphorus retention.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. An ashless antiwear additive comprising:

a triester of a dithiophosphate having two oxygen ester moieties and a sulfur ester moiety;

each oxygen ester moiety, independently, includes at least 2 or more β-hydrogens on a linear or branched hydrocarbyl group;

the sulfur ester moiety includes one or more heteroatoms selected from oxygen or nitrogen and having up to 4 carbon atoms linking at least one of the heteroatoms to the sulfur atom of the sulfur ester; and a molecular weight of at least about 490 g/mol.

2. The ashless antiwear additive of claim 1, wherein the triester of a dithiophosphate has the structure of Formula I:

(Formula I)

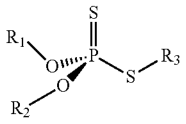

wherein $R_1$ and $R_2$ include the oxygen ester moieties and, independently, a linear or branched C3 to C100 hydrocarbyl group; and $R_3$ includes the sulfur ester moiety with a C3 to C100 linear or branched hydrocarbyl group including the one or more heteroatoms.

3. The ashless antiwear additive of claim 2, wherein the oxygen ester moieties of $R_1$ and $R_2$ are, independently, derived from one of 4-methyl-2-pentyl alcohol, isopropyl alcohol, tert-butyl alcohol, sec-butyl alcohol, 2-octanol, 2-decanol, 2-dodecanol, or combinations thereof.

4. The ashless antiwear additive of claim 2, wherein the sulfur ester moiety of $R_3$ is derived from one of (i) a vinyl ester of a carboxylic acid; (ii) a maleic acid, ester, diester or anhydride thereof; (iii) an alkyl(meth)acrylate, or combinations thereof.

5. The ashless antiwear additive of claim 4, wherein the sulfur ester moiety of $R_3$ is derived from (i) the vinyl ester of a carboxylic acid and selected from vinyl acetate, vinyl propionate, vinyl laurate, vinyl octanoate, vinyl decanoate, vinyl stearate, or combinations thereof.

6. The ashless antiwear additive of claim 4, wherein the sulfur ester moiety of $R_3$ is derived from (ii) the maleic acid, ester, diester or anhydride thereof and selected from methyl maleate, dimethyl maleate, ethyl maleate, diethyl maleate, butyl maleate, dibutyl maleate, diphenyl maleate, methyl fumarate, dimethyl fumarate, ethyl fumarate, diethyl fumarate, butyl fumarate, dibutyl fumarate, diphenyl fumarate, or combinations thereof.

7. The ashless antiwear additive of claim 4, wherein the sulfur ester moiety of $R_3$ is derived from (iii) the alkyl(meth) acrylate and selected from methyl acrylate, methyl methacrylate, ethyl acrylate, ethyl methacrylate, butyl acrylate, butyl methacrylate, or combinations thereof.

8. The ashless antiwear additive of claim 1, wherein the triester of a dithiophosphate includes each oxygen ester derived from 4-methyl-2-pentyl alcohol and the sulfur ester derived from dibutyl maleate.

9. The ashless antiwear additive of claim 1, when used in a zinc-free and low-ash passenger car motor oil having no more than 0.5 weight percent ash pursuant to ASTM D874 and having no more than 10 ppm of zinc, the zinc-free and low-ash passenger car motor oil exhibits no more than 90 microns of camshaft wear pursuant to the Sequence IVA test of ASTM D6891 and at least about 81 percent phosphorus retention pursuant to the Sequence IIIH B test of ASTM D8111.

10. The ashless antiwear additive of claim 1, wherein the molecular weight is up to about 650 g/mol.

11. The ashless antiwear additive of claim 1, further comprising no more than 6.3 weight percent phosphorus.

12. A passenger car motor oil comprising:

one or more base oils of lubricating viscosity; and a triester of a dithiophosphate antiwear additive including (i) two oxygen ester moieties with each moiety having at least 2 or more β-hydrogens on a linear or branched hydrocarbyl group; (ii) a sulfur ester moiety including one or more heteroatoms selected from oxygen or nitrogen and having up to 4 carbon atoms linking at least one of the heteroatoms to the sulfur atom of the sulfur ester; and (iii) a molecular weight of at least about 490 g/mol.

13. The passenger car motor oil of claim 12, wherein the passenger car motor oil is substantially zinc-free with no more than about 10 ppm of zinc and/or has low ash content with no more than about 0.5 weight percent sulfated ash pursuant to ASTM D874.

14. The passenger car motor oil of claim 12, further comprising a metal-containing antiwear additive selected from a metal phosphate, a metal thiophosphate, a metal dialkyl dialkyldithiophosphate, or combinations thereof and with the metal selected from aluminum, lead, tin, molybdenum, manganese, nickel, copper, titanium, zinc, or combinations thereof.

15. The passenger car motor oil of claim 12, wherein the passenger car motor oil exhibits no more than 90 microns of camshaft wear pursuant to the Sequence IVA test of ASTM D6891 and at least about 81 percent phosphorus retention pursuant to the Sequence IIIH B test of ASTM D8111.

16. The passenger car motor oil of claim 12, wherein the triester of a dithiophosphate has the structure of Formula I:

(Formula I)

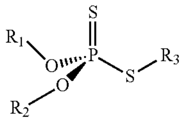

wherein $R_1$ and $R_2$ include the oxygen ester moieties and, independently, a linear or branched C3 to C100 hydrocarbyl group; and $R_3$ includes the sulfur ester moiety including a C3 to C100 linear or branched hydrocarbyl group including the one or more heteroatoms.

17. The passenger car motor oil of claim 16, wherein the one or more oxygen ester moieties of $R_1$ and $R_2$ are, independently, derived from one of 4-methyl-2-pentyl alcohol, isopropyl alcohol, tert-butyl alcohol, sec-butyl alcohol, 2-octanol, 2-decanol, 2-dodecanol, or combinations thereof.

18. The passenger car motor oil of claim 16, wherein the sulfur ester moiety of $R_3$ is derived from one of (i) a vinyl ester of a carboxylic acid; (ii) a maleic acid, ester, diester or anhydride thereof; (iii) alkyl(meth)acrylate, or combinations thereof.

19. The passenger car motor oil of claim 18, wherein the sulfur ester moiety of $R_3$ is derived from (i) the vinyl ester of a carboxylic acid and selected from vinyl acetate, vinyl propionate, vinyl laurate, vinyl octanoate, vinyl decanoate, vinyl stearate, or combinations thereof.

20. The passenger car motor oil of claim 18, wherein the sulfur ester moiety of $R_3$ is derived from (ii) the maleic acid, ester, diester or anhydride thereof and selected from methyl maleate, dimethyl maleate, ethyl maleate, diethyl maleate, butyl maleate, dibutyl maleate, diphenyl maleate, methyl fumarate, dimethyl fumarate, ethyl fumarate, diethyl fumarate, butyl fumarate, dibutyl fumarate, diphenyl fumarate, or combinations thereof.

21. The passenger car motor oil of claim 18, wherein the sulfur ester moiety of $R_3$ is derived from (iii) the alkyl(meth)

acrylate and selected from methyl acrylate, methyl methacrylate, ethyl acrylate, ethyl methacrylate, butyl acrylate, butyl methacrylate, or combinations thereof.

22. The passenger car motor oil of claim 12, wherein the triester of a dithiophosphate includes the oxygen ester moieties each derived from 4-methyl-2-pentyl alcohol and the sulfur ester derived from dibutyl maleate.

23. The passenger car motor oil of claim 12, wherein the passenger car motor oil is a zinc-free and low-ash passenger car motor oil having no more than 0.5 weight percent ash pursuant to ASTM D874 and having no more than 10 ppm of zinc, and wherein the zinc free and low-ash passenger car motor oil exhibits no more than 90 microns of camshaft wear pursuant to the Sequence IVA test of ASTM D6891 and at least about 81 percent phosphorus retention pursuant to the Sequence IIIH B test of ASTM D8111.

24. The passenger car motor oil of claim 12, wherein the molecular weight of the triester of a dithiophosphate antiwear additive is up to about 650 g/mol.

25. The passenger car motor oil of claim 12, further comprising about 50 to about 2000 ppm of phosphorus provided by the triester of a dithiophosphate antiwear additive.

26. The passenger car motor oil of claim 25, wherein the passenger car motor oil further includes no more than about 1250 ppm of calcium and/or no more than about 100 ppm of boron.

* * * * *